United States Patent
Hu et al.

(10) Patent No.: US 8,984,892 B2
(45) Date of Patent: Mar. 24, 2015

(54) COMBINED CYCLE POWER PLANT INCLUDING A HEAT RECOVERY STEAM GENERATOR

(75) Inventors: Tailai Hu, Lake Wylie, SC (US); Kelvin Rafael Estrada, Norcross, GA (US); Joel Donnell Holt, Scotia, NY (US); Diego Fernando Rancruel, Mauldin, SC (US); Leslie Yung-Min Tong, Roswell, GA (US)

(73) Assignee: General Electric Company, Schenectady, NY (US)

( * ) Notice: Subject to any disclaimer, the term of this patent is extended or adjusted under 35 U.S.C. 154(b) by 742 days.

(21) Appl. No.: 13/283,045

(22) Filed: Oct. 27, 2011

(65) Prior Publication Data

US 2012/0036828 A1     Feb. 16, 2012

Related U.S. Application Data

(63) Continuation-in-part of application No. 12/415,413, filed on Mar. 31, 2009, now abandoned.

(51) Int. Cl.

| | |
|---|---|
| *F02C 1/00* | (2006.01) |
| *F01K 13/02* | (2006.01) |
| *F01D 21/06* | (2006.01) |
| *F01K 23/10* | (2006.01) |
| *F02C 6/18* | (2006.01) |

(52) U.S. Cl.
CPC ............. *F01K 13/02* (2013.01); *F01D 21/06* (2013.01); *F01K 23/108* (2013.01); *F02C 6/18* (2013.01); *Y02E 20/16* (2013.01)
USPC ........................... 60/772; 60/39.182; 60/39.3

(58) Field of Classification Search
USPC ..................... 60/39.182, 39.3, 772
See application file for complete search history.

(56) References Cited

U.S. PATENT DOCUMENTS

| | | |
|---|---|---|
| 3,879,616 A | 4/1975 | Baker et al. |
| 4,193,446 A | 3/1980 | Greis et al. |

(Continued)

FOREIGN PATENT DOCUMENTS

JP     H1073008 A     3/1998

OTHER PUBLICATIONS

Webster's Revised Unabridged Dictionary, version published 1913 by the C. & G. Merriam Co., Springfield, Mass, pp. 1-4.

(Continued)

*Primary Examiner* — Ehud Gartenberg
*Assistant Examiner* — Lorne Meade
(74) *Attorney, Agent, or Firm* — Cantor Colburn LLP

(57) ABSTRACT

A combined cycle power plant includes a gas turbomachine, a steam turbomachine operatively coupled to the gas turbomachine, and a heat recovery steam generator operatively coupled to the gas turbomachine and the steam turbomachine. The heat recovery steam generator includes a high pressure reheat section provided with at least one high pressure superheater and at least one reheater. The combined cycle power plant further includes a controller operatively connected to the gas turbomachine, the steam turbomachine and the heat recovery steam generator. The controller is selectively activated to initiate a flow of steam through the heat recovery steam generator following shutdown of the gas turbomachine to lower a temperature of at least one of the high pressure superheater and the at least one reheater and reduce development of condensate quench effects during HRSG purge of a combined cycle power plant shutdown.

14 Claims, 6 Drawing Sheets

(56) References Cited

U.S. PATENT DOCUMENTS

| | | |
|---|---|---|
| 4,208,882 A | 6/1980 | Lopes et al. |
| 5,379,588 A | 1/1995 | Tomlinson et al. |
| 5,435,138 A | 7/1995 | Silvestri, Jr. |
| 6,237,542 B1 | 5/2001 | Nakajo et al. |
| 6,354,073 B1 | 3/2002 | Hiramoto et al. |
| 6,905,566 B1 | 6/2005 | Pitzer et al. |
| 6,983,585 B2 | 1/2006 | Hattori et al. |
| 7,028,478 B2 | 4/2006 | Prentice, III |
| 7,621,133 B2 * | 11/2009 | Tomlinson et al. ............ 60/778 |
| 7,886,538 B2 * | 2/2011 | Schottler et al. ............... 60/653 |
| 2008/0104959 A1 * | 5/2008 | Schottler et al. ............... 60/645 |
| 2009/0145104 A1 | 6/2009 | Alexander et al. |
| 2009/0158738 A1 * | 6/2009 | Hu et al. ........................ 60/646 |
| 2010/0242430 A1 | 9/2010 | Hu et al. |

OTHER PUBLICATIONS

Search Report from EP Application No. 12189826.6 dated Oct. 22, 2013.

* cited by examiner

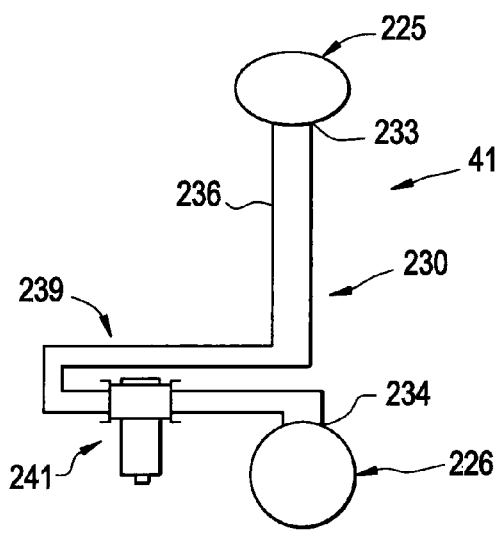
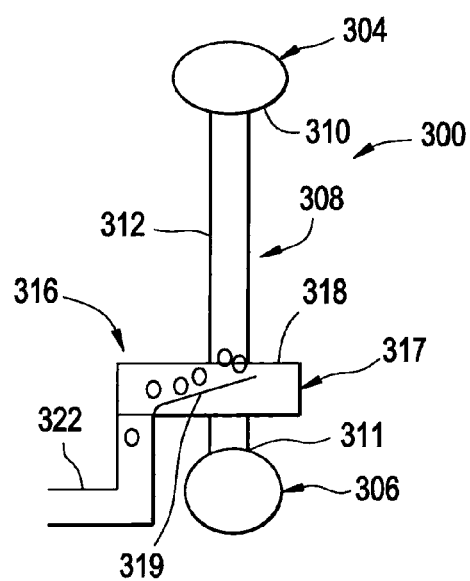

US 8,984,892 B2

COMBINED CYCLE POWER PLANT INCLUDING A HEAT RECOVERY STEAM GENERATOR

CROSS REFERENCE TO RELATED APPLICATIONS

This is a continuation-in-part application of application Ser. No. 12/415,413, filed Mar. 31, 2009.

BACKGROUND OF THE INVENTION

The subject matter disclosed herein relates to the art of turbomachines and, more particularly, to a heat recovery steam generator for a turbomachine.

Conventional combined cycle power plants employ a gas turbine system operatively coupled to a steam turbine system. The gas turbine system includes a compressor coupled to a gas turbine. The steam turbine system includes a high pressure (HP) turbine portion operatively coupled to an intermediate pressure (IP) turbine portion that, in turn, is coupled to low pressure (LP) turbine. Generally, the HP, IP and LP turbines are employed to drive a generator. In a typical combined cycle power plant, exhaust gas from the gas turbine is passed to a heat recovery steam generator (HRSG). The HRSG can have one, or multiple pressures, For a three pressure system the HRSG includes three different pressure heaters corresponding to three steam turbine pressures, e.g. HP, IP, and LP for a high performance combined cycle power plant. The HRSG also receives low energy steam from the HP steam turbine exhaust passing from the HP steam turbine. The low energy steam is used to reheat steam in the different pressure heaters for enhanced efficiency. The reheated steam is then passed back to power a lower pressure stage of the steam turbine.

Current combined cycle power plants are slow to move from rest to operational speeds. That is, at present, the time required to bring the gas turbine into operation, ramp the steam turbine up to speed and operate the HRSG is substantial. Shortening the start up time, i.e., fast starts, leads to increasing stress and cycling effects for the HRSG that leads to critical problems. In addition, multiple starts/stops resulting from periodic changes in demand also creates detrimental stresses within the HRSG. One such stress is caused by a quenching effect that occurs during HRSG purge.

For combined cycle power plants, a required HRSG purge can be done either immediately prior to plant start up or right after shutdown. The purge leads to a large amount of condensate that causes a quench effect in a superheater header portion of the HRSG. The quench effect is the result of a temperature difference between the header portion and the condensate. The quench effect increases stress within the HRSG. The increase stress ultimately results in a shorter operational life for the HRSG.

BRIEF DESCRIPTION OF THE INVENTION

According to one aspect of the invention, a combined cycle power plant includes a gas turbomachine, a steam turbomachine operatively coupled to the gas turbomachine, and a heat recovery steam generator operatively coupled to the gas turbomachine and the steam turbomachine. The heat recovery steam generator includes a high pressure reheat section provided with at least one high pressure superheater and at least one reheater. The combined cycle power plant further includes a controller operatively connected to the gas turbomachine, the steam turbomachine and the heat recovery steam generator. The controller is selectively activated to initiate a flow of steam through the heat recovery steam generator following shutdown of the gas turbomachine to lower a temperature of at least one of the high pressure superheater and the at least one reheater and reduce development of condensate quench effects during HRSG purge of a combined cycle power plant shutdown.

According to another aspect of the invention, a method of cooling a high pressure reheat section of a heat recovery steam generator (HRSG) having at least one high pressure superheater and at least one reheater during combined cycle power plant shutdown in order to reduce condensate quench effects during HRSG purge includes decelerating a gas turbine portion of the combined cycle power plant to turning gear speed. The method further includes ramping down operation of a steam turbine portion of the combined cycle power plant, flowing the steam through the heat recovery steam generator to lower internal temperatures of at least one of the at least one high pressure superheater and at least one reheater. Lowering internal temperatures of the one of the at least one high pressure superheater and at least one reheater reduces the condensate quench effect during a purge of the HRSG.

According to yet another aspect of the exemplary embodiment, a combined cycle power plant includes a gas turbomachine, a steam turbomachine operatively coupled to the gas turbomachine, and a heat recovery steam generator operatively coupled to the gas turbomachine and the steam turbomachine. The heat recovery steam generator includes a high pressure reheat section provided with at least one high pressure superheater. The combined cycle power plant further includes a condensate removal system operationally connected to the at least one high pressure superheater. The condensate removal system includes at least one of a steam separator and a heating device. Each of the steam separator and heating device operate to prevent condensate from collecting within the at least one high pressure superheater following shut down of the combined cycle power plant.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a cross-sectional side view of a superheater portion of the HRSG including a steam separator in accordance with an exemplary embodiment;

FIG. 6 is a cross-sectional side view of a superheater portion of the HRSG including a steam separator in accordance with another exemplary embodiment;

The detailed description explains embodiments of the invention, together with advantages and features, by way of example with reference to the drawings.

DETAILED DESCRIPTION OF THE INVENTION

Figure 1:
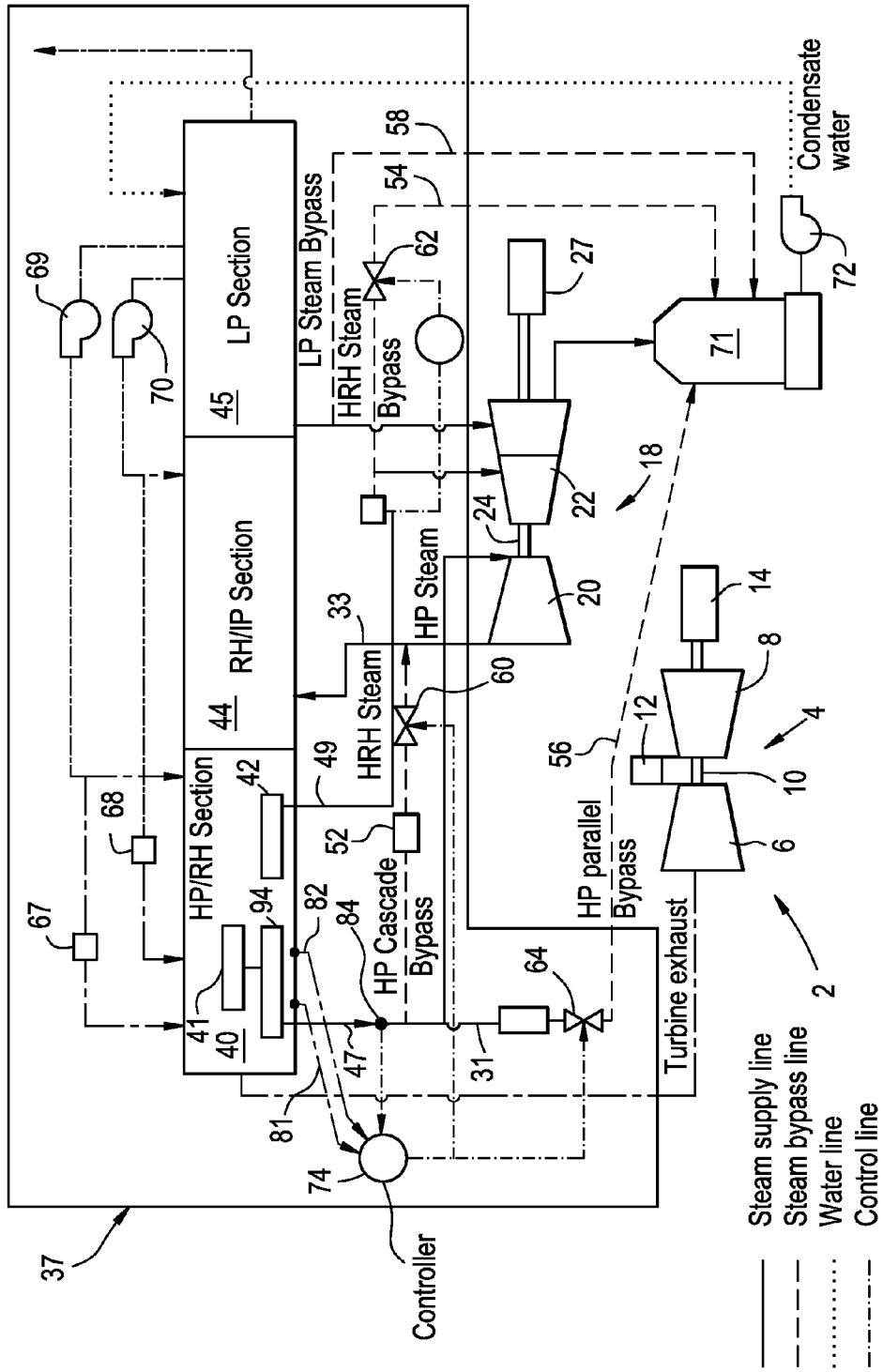
FIG. 1 is a schematic representation of a combined cycle power plant including a heat recovery steam generator (HRSG) in accordance with an exemplary embodiment.

With reference to FIG. 1, a combined cycle power plant (CCPP) constructed in accordance with an exemplary embodiment is generally indicated at 2. CCPP 2 includes a gas powered turbomachine 4 having a compressor portion 6 operatively coupled to a turbine portion 8 through a compressor/turbine shaft 10. Compressor portion 6 and turbine portion 8 are also linked via a combustor assembly 12. In the exemplary embodiment shown, turbine portion 8 is configured to drive a generator 14. CCPP 2 is also shown to include a steam powered turbomachine 18. Steam powered turbomachine 18 includes a high pressure (HP) steam turbine portion 20 operatively connected to an intermediate pressure (IP) steam turbine portion 22 through a compressor/turbine shaft 24. In a manner similar to that described above, steam powered turbomachine 18 is configured to drive a generator 27. In a manner that will be described more fully below, CCPP 2 includes a heat recovery steam generator (HRSG) 37 that is fluidly connected to gas powered turbomachine 4 and steam powered turbomachine 18.

In accordance with the exemplary embodiment shown, HRSG 37 includes a high pressure/reheat (HP/RH) section 40 having a plurality of high pressure superheaters 41, and a plurality of reheaters, one of which is indicated at 42. The plurality of high pressure superheaters 41 may be communicatively connected by a superheater header portion 94. HRSG 37 also includes a reheat/intermediate pressure (RH/IP) section 44, and a low pressure (LP) section 45. A main steam line 47 fluidly interconnects HP steam turbine 20 and (HP/RH) section 40. In addition, (HP/RH) section 40 is fluidly connected to a hot reheat (HRH) steam line 49 that fluidly connects (HP/RH) section 40 and an intermediate pressure portion (not separately labeled) of steam turbine portion 22. The HRSG 37 includes one or more pressure sensors 81 and temperature sensors 82 that are arranged to sense pressure and temperature of fluid in the superheaters 41 or in some exemplary embodiments, the pressure sensors 81 and temperature sensors 82 may be arranged to sense the temperature and pressure of fluid in the superheater header portion 94. The pressure sensors 81 and temperature sensors 82 are communicatively connected to a controller 74 such that the controller 74 receives signals from the pressure sensors 81 and temperature sensors 82 that are indicative of the sensed pressure and temperature of fluid in the superheaters 41. A temperature sensor 84 is arranged to sense the superheater 41 discharge steam temperature that corresponds to the temperature of the superheater 41 tubes and superheater header portion 94. The temperature sensor 84 is communicatively connected to the controller 74 such that the controller receives signals from the temperature sensor 84 that are indicative of the sensed temperature of the superheater 41 discharge steam temperature and correspondingly of the temperature of the superheater 41 tubes and superheater header portion 94.

As further illustrated in FIG. 1, HRSG 37 includes a plurality of bypass lines. More specifically, HRSG 37 includes a high pressure cascade bypass line 52, a hot reheat (HRH) steam bypass line 54, a high pressure parallel bypass line 56, and a low pressure steam bypass line 58. Each bypass line includes a corresponding bypass control valve such as illustrated at 60, 62 and 64. HRSG 37 also includes first and second inter-stage steam temperature attemperators 67 and 68 that are fluidly connected between HP/RH section 40 and LP section 45. Inter-stage steam temperature attemperator 67 is fluidly connected to a pump 69. Likewise, inter-stage steam temperature attemperator 68 is fluidly connected to a pump 70. Also shown is a condenser 71 that collects condensate developed during operation of combined cycle power plant 2. Condenser 71 is fluidly connected to a condensate pump 72 that is selectively operated to send condensate to LP section 45. The condensate in LP section 45 is employed in the formation of low pressure superheated steam that enters a low pressure section (not separately labeled) of IP steam turbine portion 22. As will be discussed more fully below, the presence of condensate in HR/RH section 40 during a purge of HRSG 37 can cause stress and cycling effects during start ups of CCPP 2. Towards that end, combined cycle power plant 2 includes a controller 74 that is selectively operated to lower temperatures within HP/RH section 40 prior to a purge of HRSG 37 to reduce condensate quench effects. The controller 74 may include any appropriate processing device or logical circuit suitable for performing logical control operations and controlling the CCPP 2.

Figure 2:
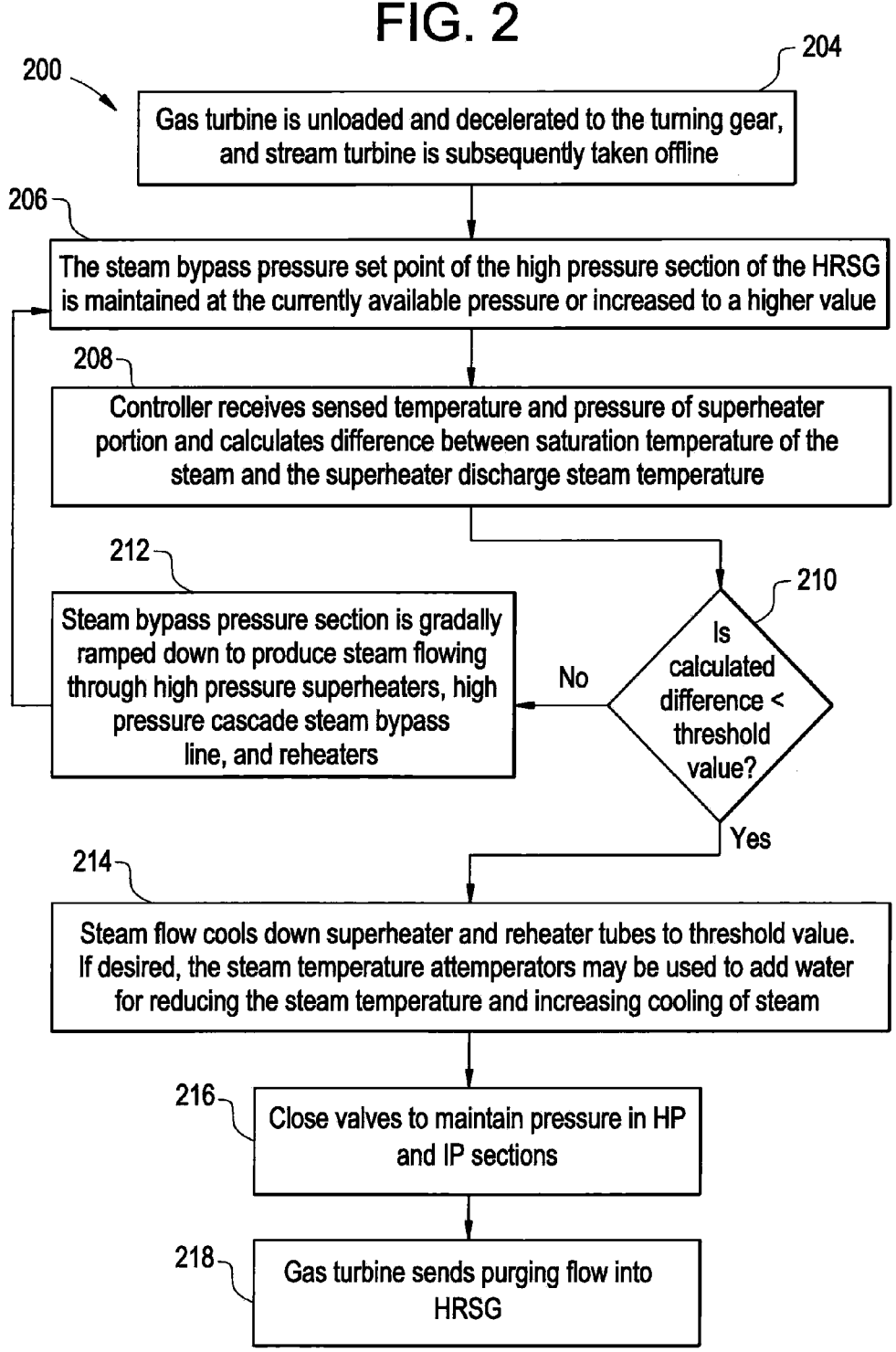
FIG. 2 is a flow chart illustrating a method of operating the combined cycle power plant of FIG. 1.
Figure 3:
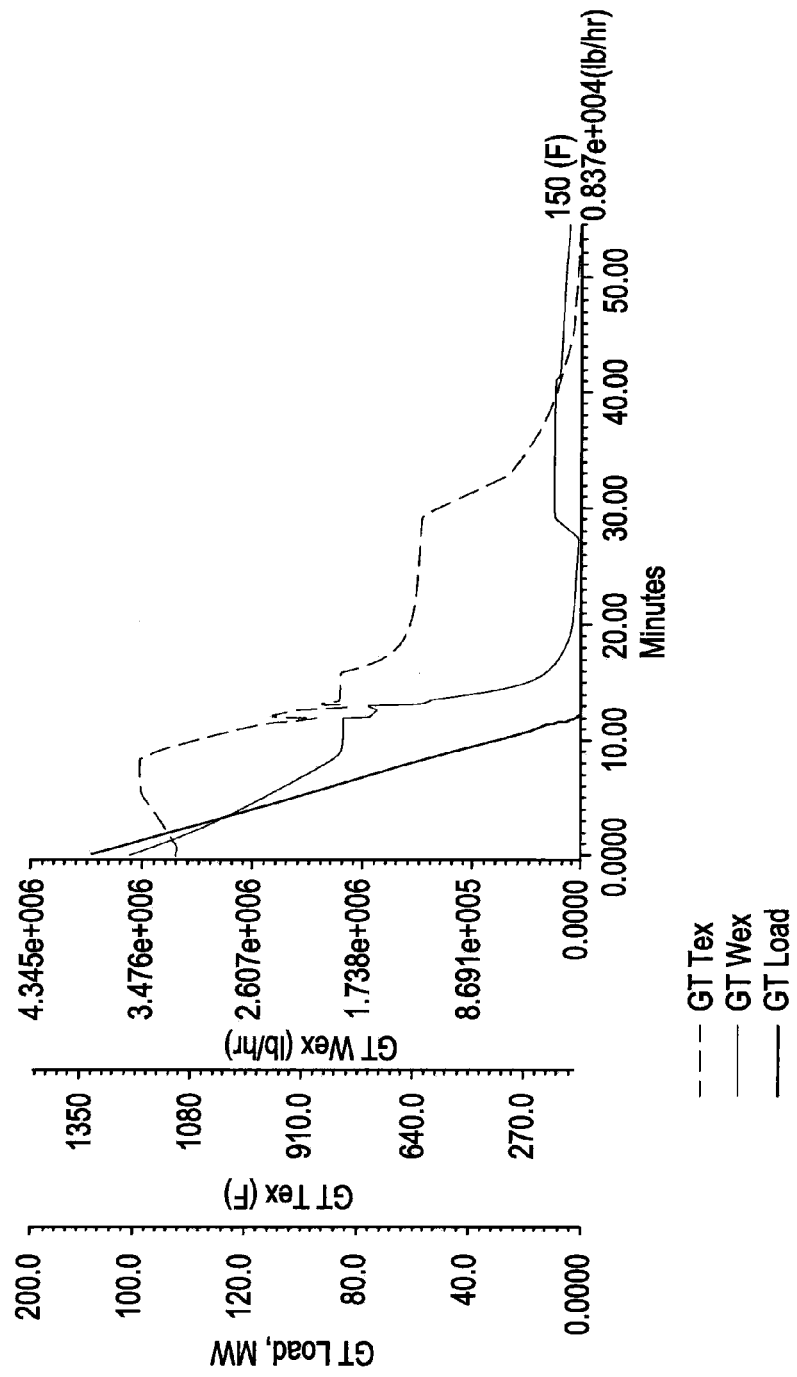
FIG. 3 is a graph illustrating one example of exhaust gas conditions of the combined cycle power plant of FIG. 1 during shut down.
Figure 4:
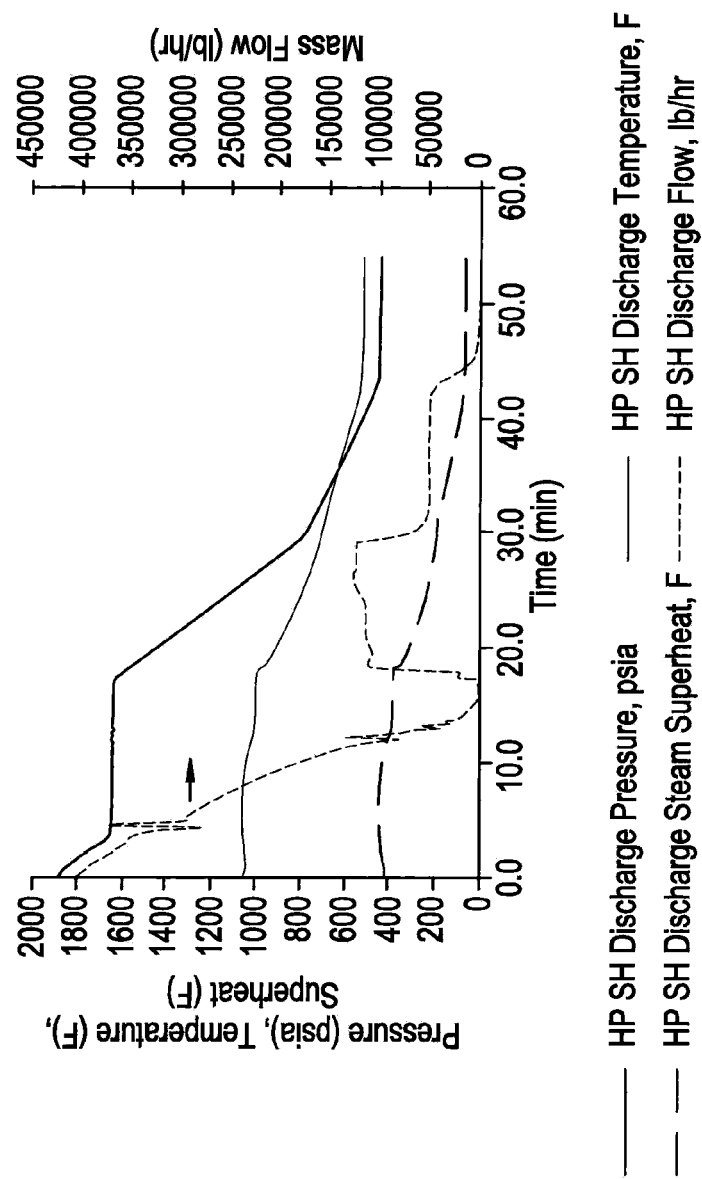
FIG. 4 is a graph illustrating one example of steam cooling effects on the HRSG of the combined cycle power plant of FIG. 1.

In accordance with an exemplary embodiment, in order to mitigate the condensate quench effects, a method 200 illustrated in FIG. 2 is employed to shut down combined cycle power plant 2. Initially, gas powered turbomachine 4 is unloaded and decelerated to turning gear as indicted in step 204. In the example shown, gas powered turbomachine 4 requires approximately 15-20 minutes to reach turning gear as indicated in FIG. 3. While gas powered turbomachine 4 decelerates, controller 74 sets a steam bypass pressure set point of HP/RH section 40 of HRSG 37 at existing levels, as indicated in step 206. Alternatively, the steam bypass pressure set point in increased to a value above existing pressures. The controller 74 receives sensed temperature and pressure of the fluid in the superheater 41 from the sensors 81 and 82 and the sensed temperature of the superheater discharged fluid and calculates a difference between the saturation temperature of the steam in the superheater 41 and the superheater discharge steam temperature in step 208. The controller 74 determines whether the calculated difference is less than a threshold value in step 210. In the illustrated embodiment, the threshold value is approximately 200° F. (about 93° C.), however any appropriate threshold value may be used. After unloading and decelerating gas powered turbomachine 4 for about 17 to 20 minutes (See FIG. 3), the steam bypass pressure set point is ramped down. Ramping down the steam bypass set point leads to steam production. The steam is directed to flow into superheaters 41, reheater 42, and HP cascade steam bypass 52 of HP/RH section 40 as indicated in block 212. The steam lowers internal temperatures of superheaters 41 as shown in FIGS. 3 and 4. In block 214, the steam is passed through superheaters 41, reheater 42, and HP cascade steam bypass 52 of HP/RH section 40 until internal temperatures drop to a target value of about 100° F. to about 250° F. (about 37.7° C. to about 121.1° C.) based on manufacturers parameters. If desired, controller 74 activates attemperators 67 and 68 to add water to the steam. Adding water creates less superheated/saturated steam that increases the cooling effect of the steam flow. In any event, once HP/RH 40 is within acceptable temperatures, in block 216, valves are closed to maintain pressure in the HP and IP sections 40 and 44. In block 218, a purging flow is sent from gas turbine 4 into HRSG 37. In this manner, HRSG 37 is capable of being rapidly brought back on line in the event demand increases.

Reference will now be made to FIG. 5 in describing high pressure superheater 41 in accordance with an exemplary embodiment. As shown, superheater 41 includes a first header 225 and a second header 226 that are fluidly connected by a plurality of conduits, one of which is indicated at 230. Conduit 230 includes a first end 233 that extends to a second end 234 through an intermediate section 236. In the exemplary embodiment shown, superheater 41 includes a condensate separating zone 239 arranged along intermediate section 236. Condensate separating zone 239 includes a steam separator 241 fluidly connected to intermediate section 236 of conduit 230. With this arrangement, high pressure steam flowing from header 225 passes through steam separator 241 prior to entering second header 226. Steam separator 241 removes most condensate entrained within the steam flowing from first header 225 to second header 226. As such, the steam entering second header 226 is substantially dry, e.g., substantially void of any condensate.

Reference will now be made to FIG. 6 in describing a superheater 300 constructed in accordance with another exemplary embodiment. As shown, superheater 300 includes a first header 304 and a second header 306 that are fluidly linked by a plurality of conduits, one of which is indicated at 308. Conduit 308 includes a first end 310 that extends to a second end 311 through an intermediate section 312. Superheater 300 includes a steam separator 316 that takes the form of a steam trap 317 fluidly connected to intermediate section 312. Steam trap 317 includes an interior chamber 318 that houses a baffle 319. With this arrangement, steam passing from first header 304 to second header 306 travels through steam trap 317. Any condensation entrained with the steam is trapped by baffle 319 and directed to a drain 322. As such, the steam passing from steam trap 317 into second header 306 is substantially dry, e.g., substantially void of any condensate.

Figure 7:
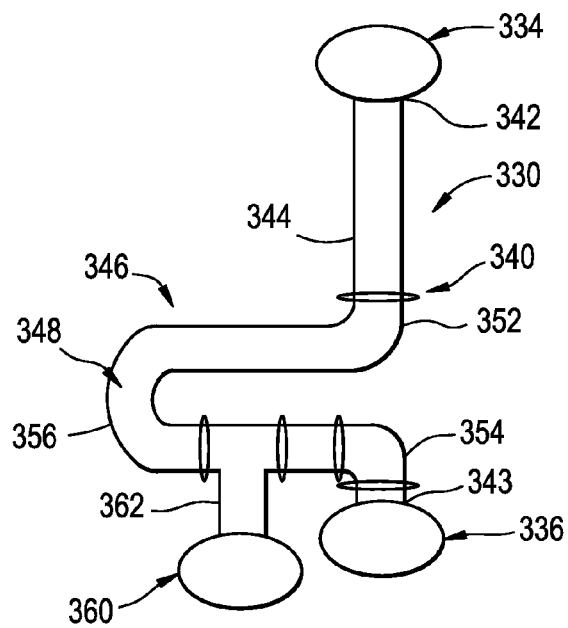
FIG. 7 is a cross-sectional side view of a superheater portion of the HRSG including a steam separator in accordance with yet another exemplary embodiment.

Reference will now be made to FIG. 7 in describing a superheater 330 constructed in accordance with yet another exemplary embodiment. Superheater 330 includes a first header 334 and a second header 336 that are fluidly connected by a plurality of conduits, one of which is indicated at 340. Conduit 340 includes a first end 342 that extends to a second end 343 through an intermediate section 344. Superheater 330 includes a steam separator 346 fluidly connected to intermediate section 344. That is, superheater 330 includes a steam trap 348 that is configured to remove condensate from the steam passing from first header 334 to second header 336. Towards that end, steam trap 348 includes a first end section 352 that is fluidly connected to first end 342 of conduit 340, and a second end section 354 that is fluidly connected to second end 343 of conduit 340. Steam trap 348 includes an intermediate portion 356 that fluidly links first end section 352 and second end section 354. A steam trap member 360 is fluidly connected to intermediate portion 356. Steam trap member 360 includes a steam trap conduit 362 that is fluidly connected to intermediate section 356. With this arrangement, steam flowing from first header 334 to second header 336 passes through steam trap 348. Any condensate trapped within the steam is removed by steam trap member 360 such that the steam entering second header 336 is substantially dry.

Figure 8:
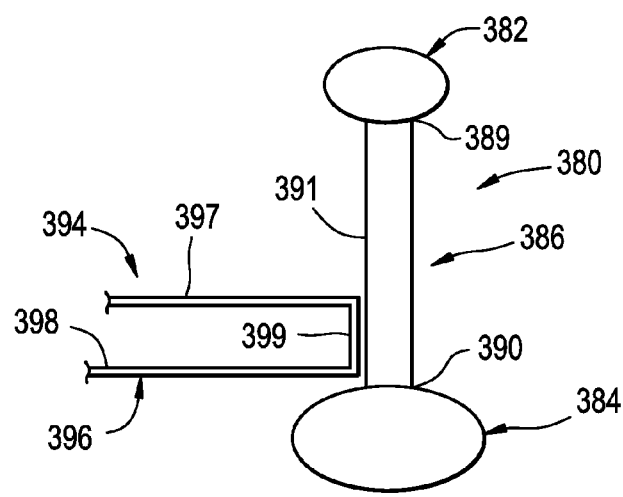
FIG. 8 is a cross-sectional side view of a superheater portion of the HRSG including a heating device for removing condensate from steam flowing within the superheater in accordance with an exemplary embodiment.

Reference will now be made to FIG. 8 in describing a superheater 380 constructed in accordance with still another exemplary embodiment. Superheater 380 includes a first header 382 and a second header 384 that are fluidly connected by a plurality of conduits, one of which is indicated at 386. Conduit 386 includes a first end 389 that extends to a second end 390 through an intermediate portion 391. First end section 389 is fluidly connected to first header 382 while second end 390 is fluidly connected to second header 384. Superheater 380 includes a heating device 394 that is operatively connected to intermediate portion 391.

In accordance with the exemplary embodiment, heating device 394 includes a steam tracer 396 having an inlet 397 that extends to an outlet 398 through a heating portion 399. Heating portion 399 is arranged directly adjacent to conduit 386. More specifically, heating portion 399 is arranged adjacent second end 390 of conduit 386. With this arrangement, auxiliary steam is passed through inlet 397 and caused to flow through heating portion 399 prior to exiting outlet 398. The auxiliary steam raises the temperature of conduit 386 about second end 390 causing any condensate trapped within the steam passing from first header 382 to second header 384 to evaporate. Steam tracer 396 removes substantially most of the condensate within the steam passing from first header 382 to second header 384. In a manner similar to that described above, by removing condensate from the steam within the superheater of the high pressure reheat section of HRSG 37, condensate quench effects are at least substantially reduced or eliminated so as to allow rapid startups of turbomachine system 2 following shutdown.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combined cycle power plant comprising:
   a gas turbomachine;
   a steam turbomachine operatively coupled to the gas turbomachine;
   a heat recovery steam generator (HRSG) operatively coupled to the gas turbomachine and the steam turbomachine, the heat recovery steam generator including a high pressure reheat section provided with at least one high pressure superheater and at least one reheater; and
   a controller operatively connected to the gas turbomachine, the steam turbomachine and the heat recovery steam generator, the controller being configured to selectively initiate a flow of steam through the heat recovery steam generator following shutdown of the gas turbomachine responsive to calculating a difference between a sensed temperature and pressure of a fluid in the at least one high pressure superheater and a superheater discharge steam temperature and determining that the calculated difference is less than a threshold value to lower a temperature of the at least one high pressure superheater and the at least one reheater and reduce development of condensate quench effects during HRSG purge of a combined cycle power plant shutdown.

2. The combined cycle power plant of claim 1, wherein the heat recovery steam generator includes a steam temperature attemperator, the controller being further configured to selectively operate the steam temperature attemperator to release water into steam flowing within the at least one high pressure superheater and at least one reheater to further lower the temperature of the high pressure reheat section.

3. The combined cycle power plant according to claim 1, wherein the controller being further configured to initiate a flow of the steam through the at least one high pressure superheater arranged within the heat recovery steam generator.

4. The combined cycle power plant according to claim 3, further comprising: a high pressure cascade steam bypass, the controller being further configured to selectively establish a flow of steam through the high pressure cascade steam bypass following shutdown of the gas turbomachine.

5. A method of cooling a high pressure reheat section of a heat recovery steam generator (HRSG) having at least one high pressure superheater and at least one reheater during combined cycle power plant shutdown in order to reduce condensate quench effects during HRSG purge, the method comprising:

decelerating a gas turbine portion of the combined cycle power plant to turning gear speed;

receiving a sensed temperature and pressure of steam in the at least one high pressure superheater;

receiving a sensed superheater discharge temperature;

calculating a difference between the sensed superheater discharge temperature and a saturation temperature of the steam in the at least one high pressure superheater;

ramping down operation of a steam turbine portion of the combined cycle power plant responsive to determining that the calculated difference is not less than a threshold value; and flowing the steam through the heat recovery steam generator to lower internal temperatures of at least one of the at least one high pressure superheater and at least one reheater, wherein lowering internal temperatures of the one of the at least one high pressure superheater and at least one reheater reduces the condensate quench effect during a purge of the HRSG responsive to determining that the calculated difference is less than the threshold value.

6. The method of claim 5, wherein flowing steam through the heat recovery steam generator comprises flowing steam through the at least one high pressure superheater.

7. The method of claim 6, wherein flowing steam through the at least one high pressure superheater comprises:

maintaining a steam bypass set point pressure within the at least one high pressure superheater at a first pressure level; and ramping down the steam bypass set point from the first pressure level to produce a steam flow.

8. The method of claim 5, further comprising: flowing steam through a high pressure cascade bypass line portion of the heat recovery steam generator to further lower internal temperatures of the at least one high pressure high pressure superheater and at least one reheater to further reduce condensate quench effects.

9. The method of claim 8, further comprising: flowing steam through at least one reheater portion of the heat recovery steam generator to still further lower internal temperatures of the one of the at least one high pressure superheater and the at least one reheater to still further reduce condensate quench effects.

10. The method of claim 5, further comprising: activating a steam temperature attemperator to release water into the steam to reduce steam temperature and increase cooling capability.

11. The method of claim 5, wherein flowing the steam through the heat recovery steam generator comprises flowing saturated steam through the heat recovery steam generator.

12. The method of claim 11, wherein flowing saturated steam through the heat recovery steam generator comprises flowing saturated steam though at least one high pressure superheater and a high pressure cascade steam bypass line.

13. The method of claim 5, further comprising: flowing the steam through heat recovery steam generator to lower internal temperatures of the one of the at least one high pressure superheater and at least one reheater to a target temperature of between about 100° F. and about 250° F. (about 37.7° C. to about 121.1° C.).

14. The method of claim 5, further comprising: sending a purging flow into the heat recovery steam generator after a target temperature is reached.

\* \* \* \* \*

UNITED STATES PATENT AND TRADEMARK OFFICE
CERTIFICATE OF CORRECTION

Page 1 of 1

PATENT NO. : 8,984,892 B2
APPLICATION NO. : 13/283045
DATED : March 24, 2015
INVENTOR(S) : Hu et al.

It is certified that error appears in the above-identified patent and that said Letters Patent is hereby corrected as shown below:

In the Specification

In Column 4, Line 19, delete "HR/RH" and insert -- HP/RH --, therefor.

Signed and Sealed this
First Day of December, 2015

Michelle K. Lee
*Director of the United States Patent and Trademark Office*